Jan. 23, 1962 J. G. WRIGHT 3,017,635
FASTENER LOCATING MEANS
Filed June 14, 1960 3 Sheets-Sheet 1
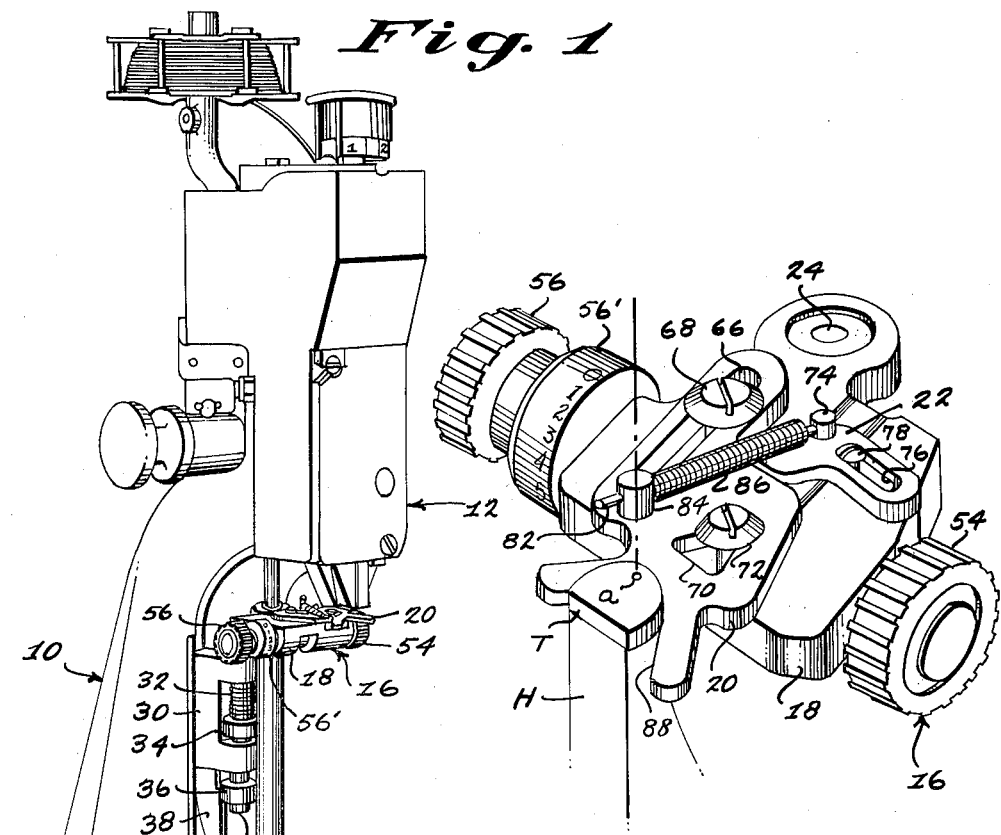
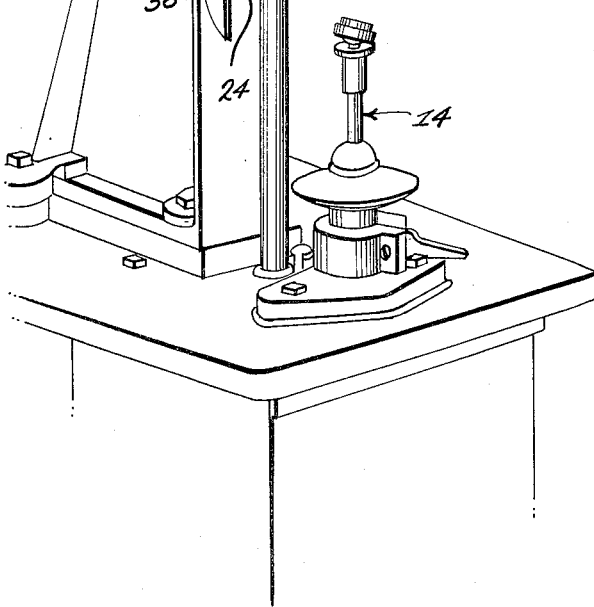
INVENTOR.
JOHN G. WRIGHT
BY
Parrott & Richards
ATTORNEYS INVENTOR.
JOHN G. WRIGHT
BY
Parrott & Richards
ATTORNEYS

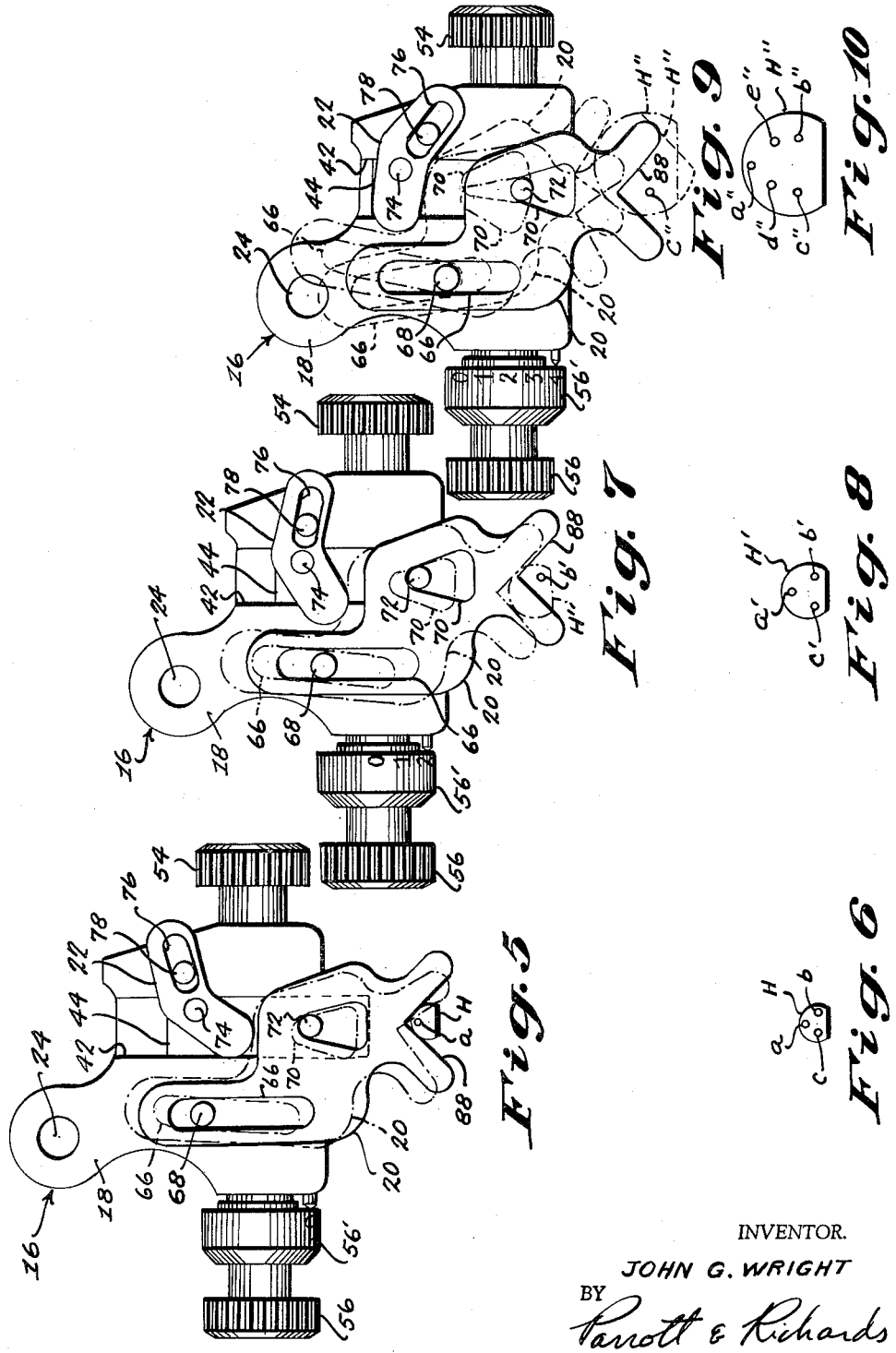

United States Patent Office 3,017,635
Patented Jan. 23, 1962

3,017,635
FASTENER LOCATING MEANS
John G. Wright, Atlanta, Ga., assignor to The Auto-Soler Company, a corporation of Georgia
Filed June 14, 1960, Ser. No. 35,959
4 Claims. (Cl. 1—19)

This invention relates in general to guide means for positioning work in relation to a machine operation or the like, and more particularly to a selectively adjustable guide means of this sort that is adapted for locating the positioned work properly for fastener insertion and that is uniquely arranged for locating a plurality of fastener inserting points at any given setting of the guide means.

Generally characterized, the guide means of the present invention, which is an improved form of the prototype means disclosed in copending application Serial No. 812,551, filed May 11, 1959, comprises a guide member and a related lever member that are arranged for respective setting through adjustment of a slide member so that the extent of work positioning action of the guide member is varied in accordance with the slide member adjustment, while still allowing the guide member to shift at any particular setting for locating a cluster of fastener insertion points spaced in proportion to the size of the work being positioned.

The embodiment of the present invention illustrated and described further below is arranged in particular for use in attaching top lifts to the heels of ladies' shoes, where the attaching fasteners must be inserted in heel bodies that are apt to vary in size considerably from shoe to shoe, and that normally require critical care in positioning for proper fastener insertion. According to the present invention this heel body positioning is readily gauged not only at a single fastener insertion location, but for all attaching fasteners needed in securing a top lift thereto, so as to facilitate exceptionally the top lift attaching operation.

In the accompanying drawings illustrating the present invention:

FIG. 1 is a perspective view showing generally the arrangement of a fastener forming and inserting machine with guide means embodying the present invention provided in relation thereto;

FIG. 2 is an enlarged illustration in perspective of the guide means;

FIG. 5 is a plan detail of the guide means illustrating the setting and manipulation thereof for a first size of heel;

FIG. 6 is a related plan detail indicating the fastener insertion pattern required for the first size of heel shown in FIG. 5;

FIG. 7 is a further plan detail corresponding generally to FIG. 5, but showing the guide means at an adjusted setting for handling a second size of heel;

FIG. 8 is a related plan detail indicating the fastener insertion pattern required for the second size of heel shown in FIG. 7;

FIG. 9 is still another plan detail corresponding generally to FIG. 5, but showing the guide means at a further adjusted setting for handling a third size of heel; and FIG. 10 is a related plan detail indicating the fastener insertion pattern required for the third size of heel shown in FIG. 9.

Figure 3:
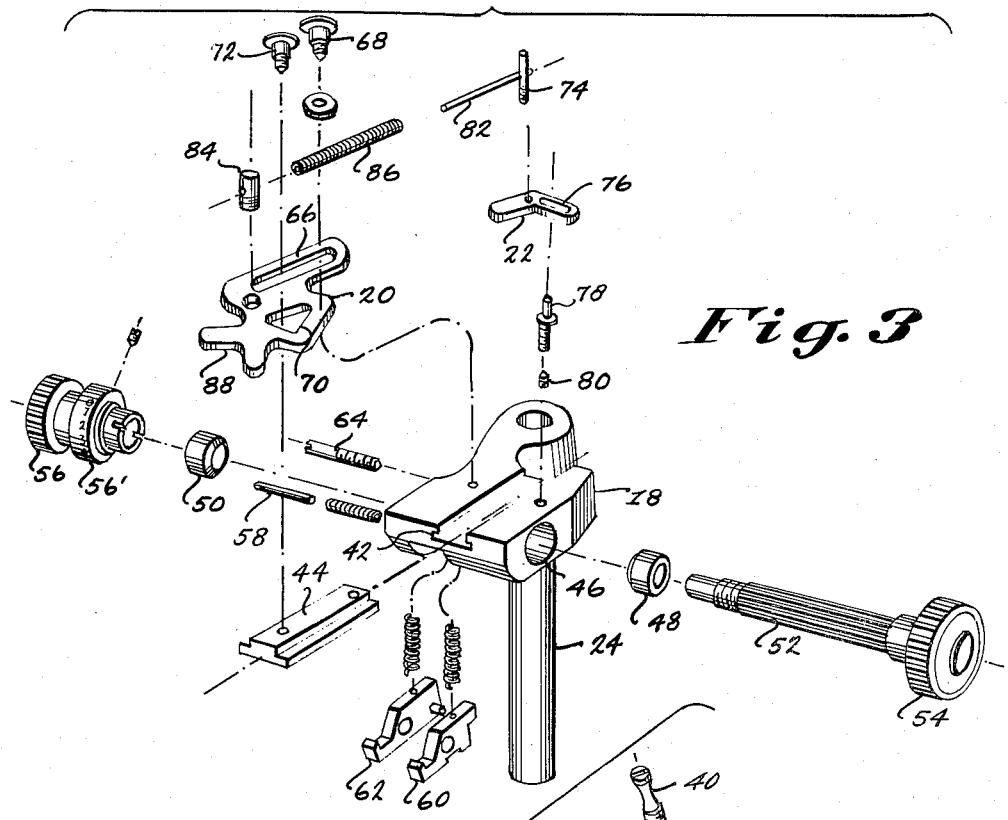
FIG. 3 is an exploded perspective illustration of the various guide means elements.

Referring now in detail to the drawings, FIG. 1 indicates generally the arrangement of a fastener forming and inserting machine of the type disclosed, for example, in U.S. Patent No. 2,698,681, in which a frame structure 10 is arranged to dispose an operating head 12 for forming and inserting fasteners downwardly into work carried by a work supporting structure 14, with guide means 16 such as is provided according to the present invention mounted for positioning the work at the operating head 12 so as to gauge the location at which the fasteners are inserted.

The guide means 16 of the present invention is illustrated further in FIG. 2 as comprising a bracket member 18 on which the previously mentioned guide member, as indicated by the reference numeral 20, and related lever member, as indicated by the reference numeral 22, are arranged for respective setting so as to position a heel H to have a top lift T attached thereto by fasteners inserted from the operating head as at a.

Figure 4:
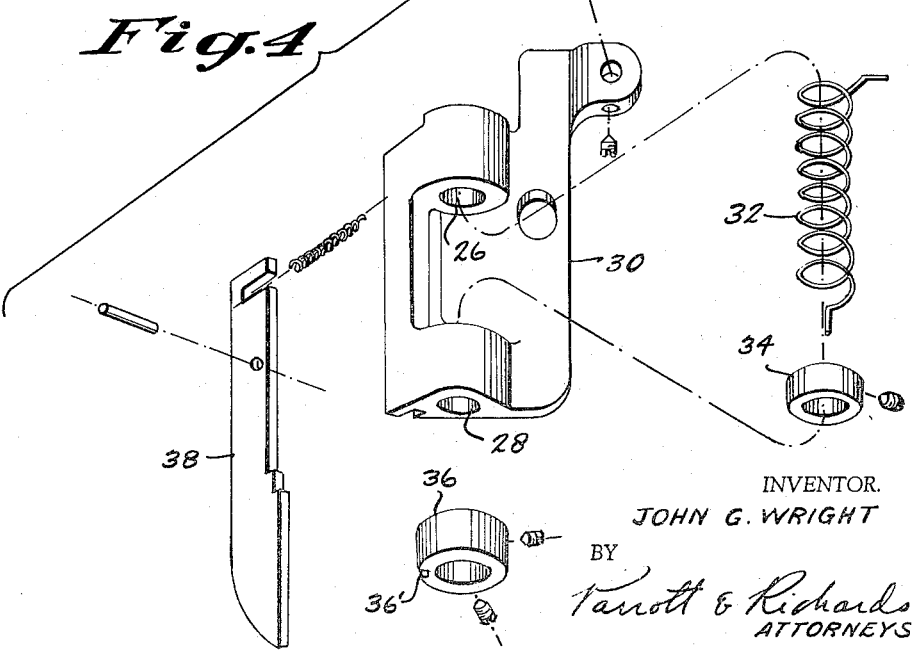
FIG. 4 is a similar exploded perspective illustration of the mounting structure for the guide means.

The several elements constituting the complete structure of the guide means 16, and their related arrangement, are illustrated more completely in the exploded views forming FIGS. 3 and 4 of the drawings, and in which the bracket member 18 is seen to be fitted with a vertical pivot stud 24 for which spaced journal bores 26 and 28 are provided in a second mounting bracket member 30 for disposition of the guide means 16 on the fastener forming and inserting machine in the manner disclosed by copending application Serial No. 784,980, filed January 5, 1959; a torsion spring 32 being arranged on the pivot stud 24 between the journal bores 26 and 28, together with a collar member 34, for applying a turning bias to swing the guide means 16 to an inactive position when not in use, while the lower end of the pivot stud 24 is fitted with a second collar 36 in which a key slot 36' is provided for engagement with a locking lever 38 pivoted on the mounting bracket member 30 to hold the guide means 16 selectively at active position in relation to a stablizing abutment member 40, all as described in further detail by the disclosure of the above noted copending application.

The guide means bracket member 18 is further arranged at an undercut groove 42 therein to carry a slide member 44 for movement thereon along a rectilinear axis, and is additionally formed with a transverse bore at 46 so as to receive bearing collars 48 and 50 for a pinion shaft 52 to engage rack teeth (not shown) at the bottom face of the slide member 44 for selectively adjusting the position of the slide member 44 along its rectilinear axis on the bracket member 18; manipulating knobs 54 and 56 being provided at each end of the pinion shaft 52 for use in effecting this slide member adjustment, and one of these manipulating knobs 56 having an indicating scale associated therewith at 56' for selecting a particular adjusted position of the slide member 44 in relation to a pointer element 58 (see FIG. 3), while a pair of pawl members 60 and 62 are mounted on a pivot pin 64 below the pinion shaft 52 for engagement therewith to hold the slide member 44 at a given adjusted position, all as again disclosed in further detail by the above noted copending application.

The previously mentioned guide member 20 is disposed on the bracket member 18 in relation to the slide member 44 through lost motion connections formed, respectively, by an elongated slot 66 in a lateral portion of guide member 20 that is arranged to extend normally in spaced parallel relation at one side of the slide member groove 42, with a screw member 68 extending therethrough and engaging the bracket member 18 to form a guide stud thereat; and by a triangular shaped aperture 70 formed in the guide member 20 so that the apex thereof is directed rearwardly and normally aligned with the rectilinear axis of the slide member 44, while the aperture 70 is otherwise normally arranged symmetrically in relation to this axis with a second screw member 72 extended therethrough and engaged in the slide member 44 to serve as a guide stud thereat.

The previously mentioned lever member 22 is mounted on the slide member 44 rearwardly of the guide member 20 at pivot pin 74 that engages the slide member 44 to pivot the lever member 22 thereon intermediate its length, and one end of the lever member 22 is slotted as seen at 76 in relation to a guide stud 78 secured in the bracket member 18 for forming a further lost motion connection thereat; the guide stud 78 preferably being formed eccentrically with respect to the threaded shank thereof so as to provide for phase adjustment of the lost motion connection of the lever member 22 in relation to the guide member 20, and a set screw 80 being accordingly provided for opposing disposition to the threaded shank of the stud 78 for locking it at a suitably adjusted position.

Additionally, the pivot pin 74 for the lever member 22 is fitted with a laterally extending rod element 82 that has the extending end thereof disposed through a laterally apertured stud element 84 carried by the guide member 20 with a compression spring 86 disposed thereon between the lever member pivot pin 74 and guide member stud element 84 to serve for biasing the guide member 20 to the normal position referred to generally above and described more in detail further below.

As arranged in the above described manner, the operation of the guide means 16 of the present invention is illustrated representatively in FIGS. 5 through 10 of the drawings, which indicate related operating manipulations of the guide means 16 for several different sizes of heels to be handled. In FIG. 5, the guide means 16 is shown with a heel H in position to have inserted therein the rear center fastener a of an attaching fastener pattern including additional fasteners b and c as shown in FIG. 6.

At the full line position shown in FIG. 5, the guide member 20 will be located, by the biasing force thereon from the spring 86, so as to assume an extended position with respect to the slide member 44 in alignment with the axis thereof, as determined by the seating of the guide stud 72 at the rearwardly directed apex of the triangular guide member aperture 70 and the related guide member positioning afforded by the guide stud 68 at the elongated lost motion slot 66. This full line position of the guide member 20 is its normally biased position, and disposes the extending portion of the guide member 20 so that the work receiving recess 88 thereat will position the heel H for proper location of the rear center fastener a upon insertion by the operating head 12 of the fastener forming and inserting machine; assuming, of course, that the slide member 44 has first been adjusted on the bracket member 18 to a proper setting for the size of heel H being handled.

Accordingly, with the guide means 16 disposed in active positioning relation at the operating head 12, it is only necessary to set the indicating scale 56' in proper relation to the size of heel H, which may be done readily in relation to an empirical size chart or the like, and then simply position the heel H in the guide member recess 88 to have it positioned properly for insertion of the fastener a. After insertion of the fastener a as thus located, rearward manual pressure on the heel H in the work receiving recess 88 will, if directed towards the left as seen in FIG. 5, cause the guide member 20 to retract until it abuts the adjacent end of the lever member 22, while the right side of the triangular guide member aperture 70 slides backwardly along the guide stud 72 to the extent permitted by the lever member 22, so that the guide member 20 will reach a retracted position such as is indicated in dotted lines in FIG. 5, and at which the heel H would then be located properly for insertion of the right forward fastener b of the pattern indicated in FIG. 6.

Such fastener insertion at a retracted position is indicated in FIG. 7, in relation to a larger size of heel H' which is shown located by the leftwardly retracted guide member 20 in position to have the right forward fastener b' inserted therein of a pattern comprising fasteners a', b' and c as seen in FIG. 8; it being noted that the heel H' is of a larger size and that the slide member 44 has accordingly been adjusted rearwardly to a new setting to accommodate this larger size, such accommodation being effected by pivotal shifting of the lever member 22 from the rearward adjustment of the slide member 44 to allow a greater extent of retraction of the guide member 20 against the bias thereof in locating the insertion point for the fastener b'.

In a similar manner, by simply directing the rearward pressure on the guide member 20 to the right, rather than to the left, the insertion point for a left forward fastener can be located as illustrated in FIG. 9 for a still larger size of heel H'', in which a pattern of fasteners a'', b'', c'', d'', and e'' are to be inserted as indicated in FIG. 10. At the adjusted setting of the guide member 20 seen in FIG. 9 for the still larger size of heel H'' it should be noted that the lever member 22 has been pivoted by rearward adjustment of the slide member 44 so as to allow retraction of the guide member 20 to the full extent of the triangular aperture 70 therein, and FIG. 9 includes two dotted illustrations showing the alternate retracted positions of the guide member 20 as being located symmetrically to each side of the axis of slide 44, while the extended full line guide member position is aligned with this axis.

It may be further noted in FIG. 9 that the additional fasteners d'' and e'' of the fastener pattern indicated in FIG. 10 may be located readily by rotating the heel H'' about 45° and pressing the guide member 20 to the retracted position corresponding with the direction in which the heel H'' is rotated, in which case the location for fastener d'', for example, would coincide with that shown in FIG. 9 for the fastener c''.

The present invention has been described in detail above for purposes of illustration only and is not intended to be limited by this description or otherwise except as defined in the appended claims.

I claim:

1. A work positioning device for a fastener inserting machine comprising a bracket member, a slide member carried on said bracket member, means for adjusting the position of said slide member on said bracket member, a work guiding member having a work receiving recess and lost motion connections with both said bracket member and said slide member, a lever member pivoted intermediate its length on said slide member and having a lost motion connection adjacent one end thereof with said bracket member, means biasing said work guiding member away from said lever member to the farthest position allowed by the lost motion connection of said work guiding member with said slide member, and the other end of said lever member limiting opposite motion of said work guiding member against the bias thereon in accordance with the adjusted position of said slide member on said bracket member.

2. A work positioning device for a fastener inserting machine comprising a bracket member, a slide member carried on said bracket member for movement along a rectilinear axis, means for selectively adjusting the position of said slide member on said bracket member along said axis, a work guiding member formed with a work positioning portion and having lost motion connections with both said bracket member and said slide member by which controlled relative movement of said work guiding member is allowed between an extended position with respect to said slide member in alignment with said axis and alternate retracted positions located symmetrically to each side of said axis, means biasing said work guiding member to assume normally said extended position, and a lever member pivoted intermediate its length on said slide member rearwardly of said work guiding member and having a lost motion connection adjacent one end thereof by which said lever member is pivoted on said slide member as the latter is adjusted along said axis so as to dispose the other end of said lever member to limit the extent of retracted positioning of said work guiding member in accordance with the adjusted slide member position.

3. A work positioning device as defined in claim 2 and further characterized in that the means biasing said work guiding member comprises a compression spring extending from the pivot axis of said lever member, whereby the biasing force of said spring is maintained substantially constant at all adjusted positions of said slide member.

4. A work positioning device for locating fasteners inserted by a fastener inserting machine, said device comprising a bracket member, a slide member carried on said bracket member for movement along a rectilinear axis, means for selectively adjusting the position of said slide member on said bracket member along said axis, a work guiding member carried on said slide member for adjustment therewith, said work guiding member being formed with a work positioning portion extending forwardly in relation to said slide member and being connected with said bracket member as well as said slide member for relative movement, the connection with said slide member being formed by a triangular aperture in said work guiding member oriented with its apex extending oppositely with respect to said work positioning portion and by a guide stud on said slide member extending through said aperture, and the connection with said bracket member being formed by an elongated slot in said work guiding member and by a first guide stud on said bracket member extending through said slot at a location such that said slot is aligned parallelly with respect to the axis of said slide member when said slide member guide stud is disposed at the apex of said triangular aperture, means biasing said work guiding member to assume normally the position determined by the disposition of said slide member guide stud at the apex of said triangular aperture, and a lever member pivoted intermediate its length on said slide member to dispose one end thereof rearwardly of said work guiding member with the other end portion thereof overlying said bracket member and having an elongated slot formed lengthwise therein through which a second guide stud on said bracket member extends, whereby said lever member is pivotally adjusted with respect to said slide member as the latter is adjusted along its axis so that the first mentioned end of said lever member serves to limit the extent of relative movement of said work guiding member in accordance with the adjusted slide member position.

No references cited.